US008541897B2

(12) United States Patent
Khoshnevis

(10) Patent No.: US 8,541,897 B2
(45) Date of Patent: Sep. 24, 2013

(54) GENERATION OF ELECTRIC ENERGY USING CABLE-SUPPORTED WINDMILLS

(75) Inventor: Behrokh Khoshnevis, Marina del Rey, CA (US)

(73) Assignee: University of Southern California, Los Angeles, CA (US)

( * ) Notice: Subject to any disclaimer, the term of this patent is extended or adjusted under 35 U.S.C. 154(b) by 359 days.

(21) Appl. No.: 12/873,534

(22) Filed: Sep. 1, 2010

(65) Prior Publication Data

US 2011/0049905 A1    Mar. 3, 2011

Related U.S. Application Data

(60) Provisional application No. 61/239,019, filed on Sep. 1, 2009.

(51) Int. Cl.
*F03D 9/00*      (2006.01)
*H02P 9/04*      (2006.01)

(52) U.S. Cl.
USPC .............................................. 290/44; 290/55

(58) Field of Classification Search
USPC ........................................................ 290/44, 55
See application file for complete search history.

(56) References Cited

U.S. PATENT DOCUMENTS

| | | | | |
|---|---|---|---|---|
| 1,876,595 A * | 9/1932 | Beldimano | ...................... | 415/60 |
| 2,218,867 A * | 10/1940 | Beldimano | ...................... | 416/121 |
| 3,782,222 A * | 1/1974 | Berggren | ...................... | 74/590 |
| 4,031,405 A * | 6/1977 | Asperger | ...................... | 290/55 |
| 4,084,102 A * | 4/1978 | Fry et al. | ...................... | 290/55 |
| 4,165,468 A * | 8/1979 | Fry et al. | ...................... | 290/55 |
| 4,183,717 A * | 1/1980 | Yamada | ...................... | 416/121 |
| 4,217,501 A | 8/1980 | Allison | ...................... | 290/55 |
| 4,220,870 A * | 9/1980 | Kelly | ...................... | 290/44 |
| 4,291,233 A * | 9/1981 | Kirschbaum | ...................... | 290/1 C |
| 4,311,435 A * | 1/1982 | Bergero | ...................... | 416/170 R |
| 4,403,916 A * | 9/1983 | Skelskey | ...................... | 416/14 |
| 4,427,342 A * | 1/1984 | Sutz et al. | ...................... | 416/170 R |
| 4,877,374 A * | 10/1989 | Burkett | ...................... | 416/136 |
| 4,894,554 A | 1/1990 | Farmer | ...................... | 290/55 |
| 5,040,948 A * | 8/1991 | Harburg | ...................... | 416/85 |
| 5,222,924 A * | 6/1993 | Shin et al. | ...................... | 475/329 |
| 5,328,334 A * | 7/1994 | McCauley | ...................... | 416/196 A |
| 5,642,984 A * | 7/1997 | Gorlov | ...................... | 416/176 |
| 6,036,443 A * | 3/2000 | Gorlov | ...................... | 416/176 |
| 7,063,501 B2 * | 6/2006 | Selsam | ...................... | 415/4.3 |
| 7,075,189 B2 | 7/2006 | Heronemus et al. | ...................... | 290/44 |
| 7,183,664 B2 * | 2/2007 | McClintic | ...................... | 290/55 |
| 7,418,820 B2 * | 9/2008 | Harvey et al. | ...................... | 60/487 |
| 7,436,086 B2 * | 10/2008 | McClintic | ...................... | 290/55 |
| 7,569,943 B2 * | 8/2009 | Kovach et al. | ...................... | 290/44 |
| 7,595,565 B2 * | 9/2009 | Chen et al. | ...................... | 290/55 |
| 7,656,055 B2 * | 2/2010 | Torres et al. | ...................... | 290/55 |

(Continued)

*Primary Examiner* — Pedro J Cuevas
(74) *Attorney, Agent, or Firm* — McDermott Will & Emery LLP

(57) ABSTRACT

An electric energy generation system may include a plurality of windmills, a windmill support system, an electric generator, and a coupling system. The windmills may each be configured to transform wind energy into rotational energy. The windmill support system may support the windmills in positions that are spaced apart from one another. The electric generator may be configured to transform rotational energy into electric energy. The coupling system may be configured to couple the rotational energy generated by each of the windmills to the electric generator in a manner that permits the windmills to rotate at different speeds during operation of the electric energy generation system. Other configurations are also disclosed.

17 Claims, 9 Drawing Sheets

(56) References Cited

U.S. PATENT DOCUMENTS

| | | | |
|---|---|---|---|
| 7,789,793 B2* | 9/2010 | Koleoglou | 475/344 |
| 7,811,060 B2* | 10/2010 | Vanderhye | 416/120 |
| 7,863,767 B2* | 1/2011 | Chapple et al. | 290/54 |
| 7,932,620 B2* | 4/2011 | Plant, Jr. | 290/55 |
| 7,959,404 B2* | 6/2011 | Caldwell | 415/2.1 |
| 8,007,236 B2* | 8/2011 | Sherman et al. | 416/85 |
| 8,181,455 B2* | 5/2012 | Tsutsumi et al. | 60/398 |
| 8,197,179 B2* | 6/2012 | Selsam | 415/4.5 |
| 2003/0147739 A1* | 8/2003 | Crinion | 415/4.3 |
| 2004/0202543 A1* | 10/2004 | Okazaki | 416/170 R |
| 2005/0214117 A1* | 9/2005 | Selsam | 416/16 |
| 2006/0188371 A1* | 8/2006 | Christensen et al. | 416/147 |
| 2006/0210406 A1* | 9/2006 | Harvey et al. | 417/334 |
| 2006/0233635 A1 | 10/2006 | Selsam | 415/4.3 |
| 2007/0024058 A1* | 2/2007 | McClintic | 290/44 |
| 2007/0041823 A1* | 2/2007 | Miller | 415/4.1 |
| 2007/0138798 A1* | 6/2007 | McClintic | 290/44 |
| 2008/0296897 A1* | 12/2008 | Kovach et al. | 290/44 |
| 2009/0048051 A1* | 2/2009 | Koleoglou | 475/183 |
| 2009/0058095 A1* | 3/2009 | McClintic | 290/55 |
| 2009/0140522 A1* | 6/2009 | Chapple et al. | 290/43 |
| 2009/0230688 A1* | 9/2009 | Torres et al. | 290/55 |
| 2009/0273186 A1* | 11/2009 | Plant, Jr. | 290/44 |
| 2010/0001525 A1* | 1/2010 | Yang | 290/44 |
| 2010/0032959 A1* | 2/2010 | Nies | 290/55 |
| 2010/0034656 A1* | 2/2010 | Miller | 416/170 R |
| 2010/0056315 A1* | 3/2010 | Scholte-Wassink | 475/159 |
| 2010/0074760 A1* | 3/2010 | Sherman et al. | 416/244 R |
| 2010/0111697 A1* | 5/2010 | Wood | 416/128 |
| 2010/0270809 A1* | 10/2010 | Dahlhaug | 290/55 |
| 2010/0320769 A1* | 12/2010 | Miranda | 290/55 |
| 2010/0320770 A1* | 12/2010 | Dahlhaug | 290/55 |
| 2011/0109094 A1* | 5/2011 | Kenway et al. | 290/55 |
| 2011/0120108 A1* | 5/2011 | Garmong | 60/398 |
| 2011/0142596 A1* | 6/2011 | Nies | 415/13 |
| 2012/0014795 A1* | 1/2012 | Blonder | 416/132 B |
| 2012/0047886 A1* | 3/2012 | Tsutsumi et al. | 60/398 |
| 2012/0061958 A1* | 3/2012 | Tsutsumi et al. | 290/44 |
| 2012/0061969 A1* | 3/2012 | Tsutsumi et al. | 290/55 |
| 2012/0063898 A1* | 3/2012 | Tsutsumi et al. | 416/146 R |
| 2012/0063929 A1* | 3/2012 | Tsutsumi et al. | 417/330 |
| 2012/0104752 A1* | 5/2012 | Tsutsumi et al. | 290/44 |
| 2012/0124984 A1* | 5/2012 | Akashi et al. | 60/398 |
| 2012/0141267 A1* | 6/2012 | Kang | 416/1 |
| 2012/0146334 A1* | 6/2012 | Lu | 290/55 |
| 2012/0148407 A1* | 6/2012 | Akashi et al. | 416/95 |
| 2012/0153631 A1* | 6/2012 | Nomoto et al. | 290/55 |
| 2012/0161442 A1* | 6/2012 | Chapple | 290/44 |
| 2012/0255291 A1* | 10/2012 | Kameda et al. | 60/398 |
| 2012/0257970 A1* | 10/2012 | Akashi et al. | 416/95 |
| 2012/0257994 A1* | 10/2012 | Tsutsumi et al. | 417/405 |
| 2012/0286519 A1* | 11/2012 | Yoon | 290/55 |

* cited by examiner

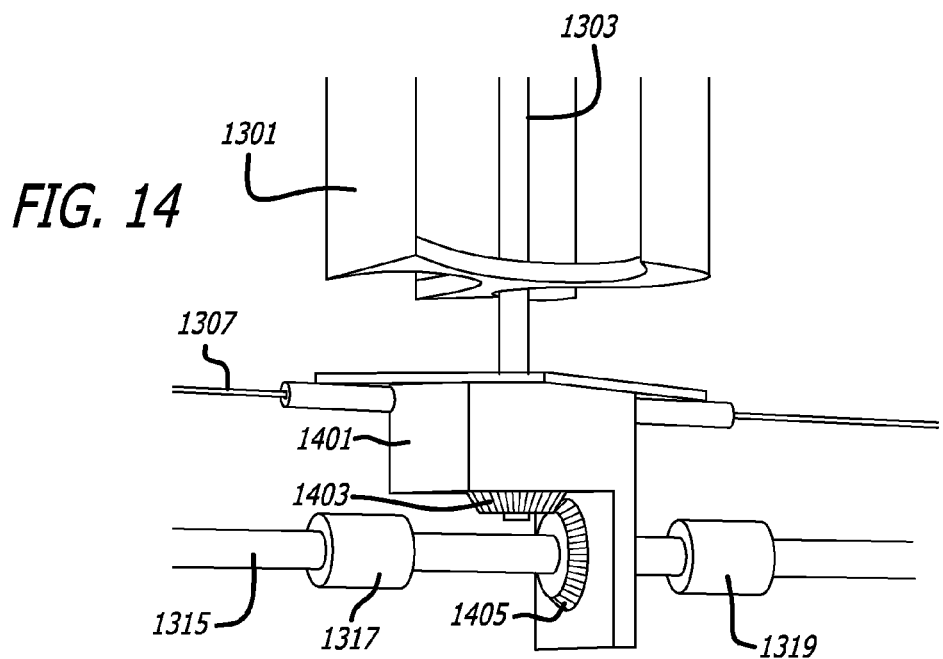
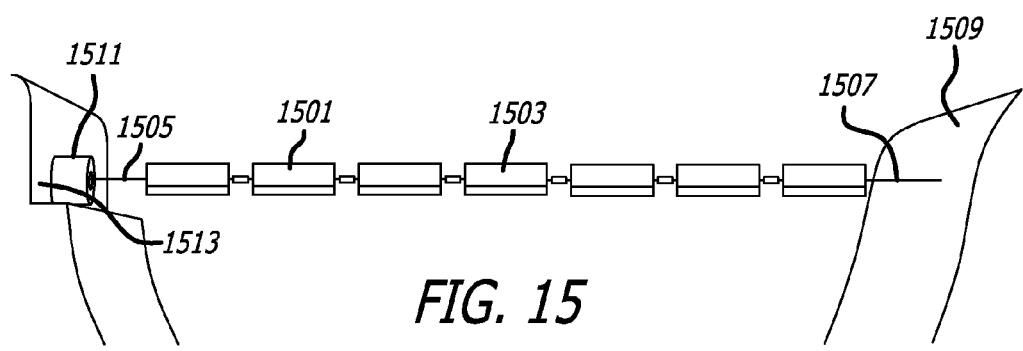

GENERATION OF ELECTRIC ENERGY USING CABLE-SUPPORTED WINDMILLS

CROSS-REFERENCE TO RELATED APPLICATION

This application is based upon and claims priority to U.S. provisional patent application 61/239,019, entitled "CABLE BASED INSTALLATION OF WINDMILLS FOR ELECTRIC ENERGY GENERATION," filed Sep. 1, 2009. The entire content of this application is incorporated herein by reference.

BACKGROUND

1. Technical Field

This disclosure relates to the generation of electric energy using cable-supported windmills.

2. Description of Related Art

Windmills suspended by cables have been proposed for the generation of electric energy. Such systems, however, can be challenging to implement effectively and economically. For example, it can be difficult to fully convert the power that each windmill can individually generate when they are configured to drive a common shaft coupled to a common electric generator. The optimal orientation of a windmill suspended between cables can also be lost when the windmill twists during operation. Heavy electric generators can also be challenging to suspend from inexpensive cables. It may also be difficult to combine the outputs of several windmills that rotate about a horizontal axis in order to drive a common electric generator. Guying each tower that supports windmill cables can also be costly and wasteful of land.

SUMMARY

An electric energy generation system may include a plurality of windmills, a windmill support system, an electric generator, and a coupling system. The windmills may each be configured to transform wind energy into rotational energy. The windmill support system may support the windmills in positions that are spaced apart from one another. The electric generator may be configured to transform rotational energy into electric energy. The coupling system may be configured to couple the rotational energy generated by each of the windmills to the electric generator in a manner that permits the windmills to rotate at different speeds during operation of the electric energy generation system.

The coupling system may include a common shaft configured to be driven by each of the windmills.

For each of the windmills, a ratchet gear may couple the windmill to the common shaft.

For each of the windmills, an automatic transmission may be connected between the windmill and the common shaft.

The electric generator may be on the ground.

The windmill support system may include at least one cable supporting the windmills.

The coupling system may include a common shaft coupled to each of the windmills. The common shaft may include a flexible coupling between each neighboring set of windmills configured to permit the common shaft to bend along its shaft axis during operation of the electric energy generation system. The common shaft may include a telescoping coupling between each neighboring set of windmills configured to permit the length of the common shaft between each neighboring set of windmills to change during operation of the electric energy generation system.

The electric energy generation system may include a counterbalancing system configured to substantially counterbalance rotational torque applied by a windmill to the windmill support during operation of the electric energy generation system. The counterbalancing system may include at least one flap configured to convert wind energy into counterbalancing rotational force. An arm may be connected between the flap and the windmill support.

The counterbalancing system may include a second windmill configured to rotate in a direction opposite the rotational direction of the first windmill during operation of the electric energy generating system. An arm may be coupled to the windmill support and to and between each of the windmills. Both windmills may face in the same direction.

For each of the windmills, a hydraulic pump may be coupled to the windmill and configured to transform the rotational energy of the windmill into fluidic pressure. A hydraulic motor may be coupled to the electric generator and configured to transform the fluidic pressure from the hydraulic pumps into rotational energy.

For each of the hydraulic pumps, a check valve may be configured to prevent fluid from flowing through the hydraulic pump in the reverse direction.

Each of the hydraulic pumps may be configured to provide substantially constant output pressure, not withstanding changes in the rotational rate of the windmill to which the hydraulic pump is coupled.

A set of meshing beveled gears may be configured to transfer rotational energy from each windmill to the common shaft.

The windmill support system may include a lattice of substantially vertical supports and at least one substantially horizontal cable connecting each vertical support to each of its immediately neighboring vertical supports. At least one windmill may be suspended from each of the substantially horizontal cables.

The windmill support system may be configured to support the windmills in positions that are spaced apart from one another and which result in the rotational axis of the windmills being substantially vertical. The windmill support system may include at least two substantially parallel cables between which each windmill is positioned.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings illustrate illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps which are illustrated. When the same numeral appears in different drawings, it refers to the same or like components or steps.

FIGS. 3-6 illustrate prior art windmills which also catch wind traveling in both the vertical and horizontal directions.

FIG. 14 illustrate an enlarged view of the lower section of one of the windmills illustrated in FIG. 13 and its associated meshing beveled gears.

FIG. 15 illustrates a plurality of windmills which drive a common horizontal shaft coupled to a common electric generator.

DETAILED DESCRIPTION OF ILLUSTRATIVE EMBODIMENTS

Illustrative embodiments are now described. Other embodiments may be used in addition or instead. Details which may be apparent or unnecessary may be omitted to save space or for a more effective presentation. Some embodiments may be practiced with additional components or steps and/or without all of the components or steps which are described.

FIGS. 1-6 illustrate prior art windmills which rotate about a vertical axis. These windmills may effectively catch wind coming from any horizontal direction. However, their supports can be costly to build, particularly when a large number are needed. FIGS. 3-6 also illustrate prior art windmills which can catch wind traveling in both the vertical and horizontal directions.

Figure 1:
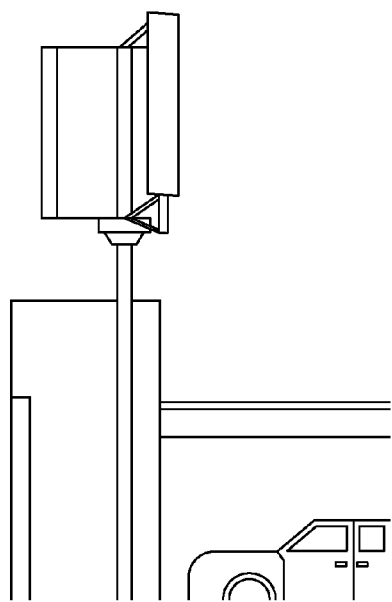
FIGS. 1-6 illustrate prior art windmills which rotate about a vertical axis.
Figure 2:
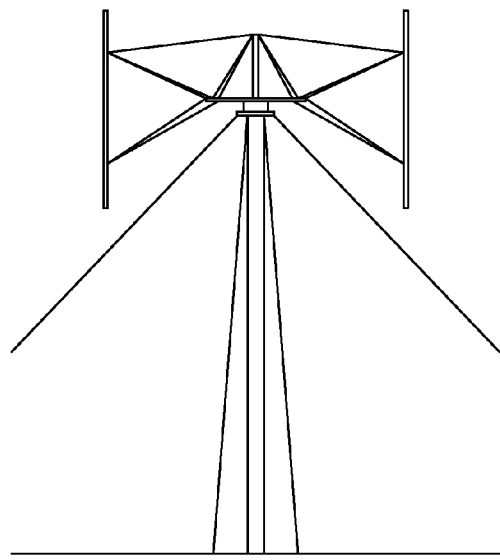
Figure 3:
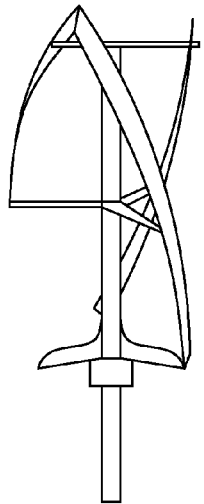
Figure 4:
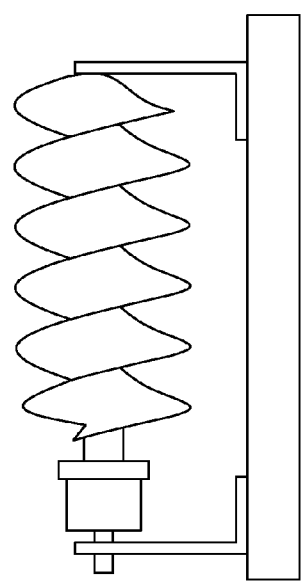
Figure 5:
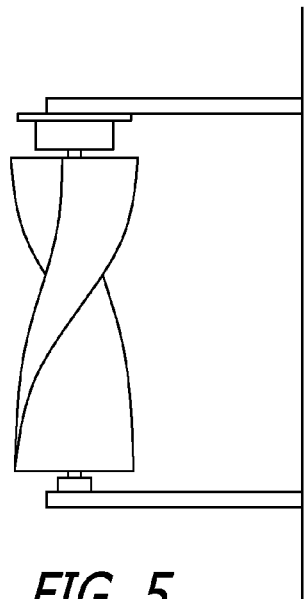
Figure 6:
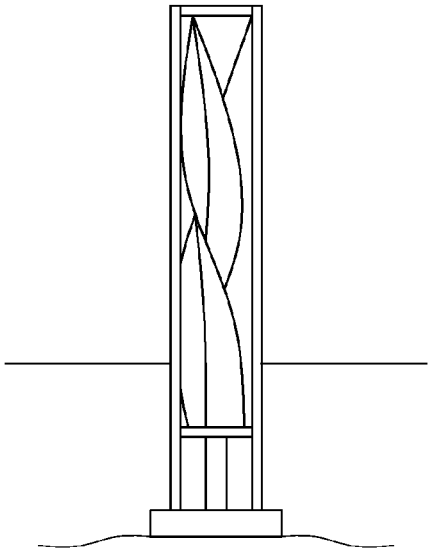
Figure 7:
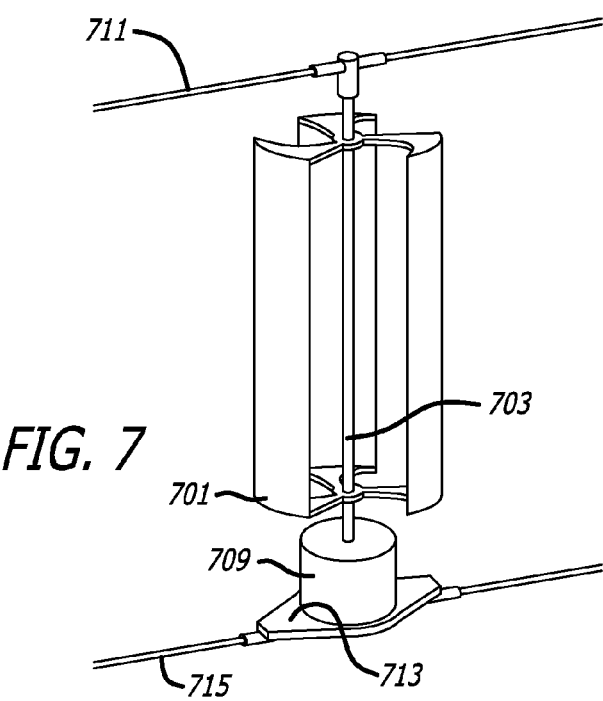
FIG. 7 illustrates a windmill and associated electric generator which are both supported by two substantially parallel cables.

FIG. 7 illustrates a windmill and associated electric generator which are both supported by two substantially parallel cables. As illustrated in FIG. 7, a windmill 701 may be configured to rotate about a vertical shaft 703 which drives an electric generator 709. The configuration of the windmill 701 may be such as to transform wind energy coming from any horizontal direction into rotational energy. In turn, this may be transferred by the shaft 703 to the electric generator 709 which may be configured to transform the rotational energy into electric energy. The top of the shaft 703 may be coupled through a bushing to a substantially horizontal, upper cable 711, while the electric generator 709 may be supported by a platform 713 which, in turn, may be supported by a substantially horizontal, lower cable 715.

Only a single cable or more than two cables may be used to support the windmill 701 and the electric generator 709. Electrical current from the electric generator 709 may be configured to be carried by one or more of the supporting cables, such as cables 711 and 715.

Figure 8:
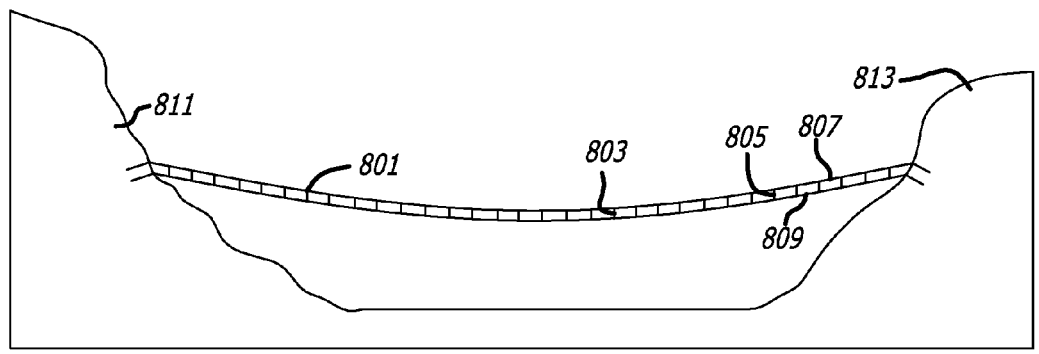
FIG. 8 illustrates a plurality of windmills and associated electric generators which are supported by two substantially parallel cables connected at each end to a mountain slope.

FIG. 8 illustrates a plurality of windmills and associated electric generators which are supported by two substantially parallel cables connected at each end to a mountain slope. For example, windmills/generators 801, 803, and 805, may be supported by substantially parallel cables 807 and 809. The cables may be anchored at their end to a mountain slope, such as mountain slopes 811 and 813. One or more of the cable ends may instead be anchored to a cliff, pole, building, tower, column, and/or to any other type of supporting structure.

Figure 9:
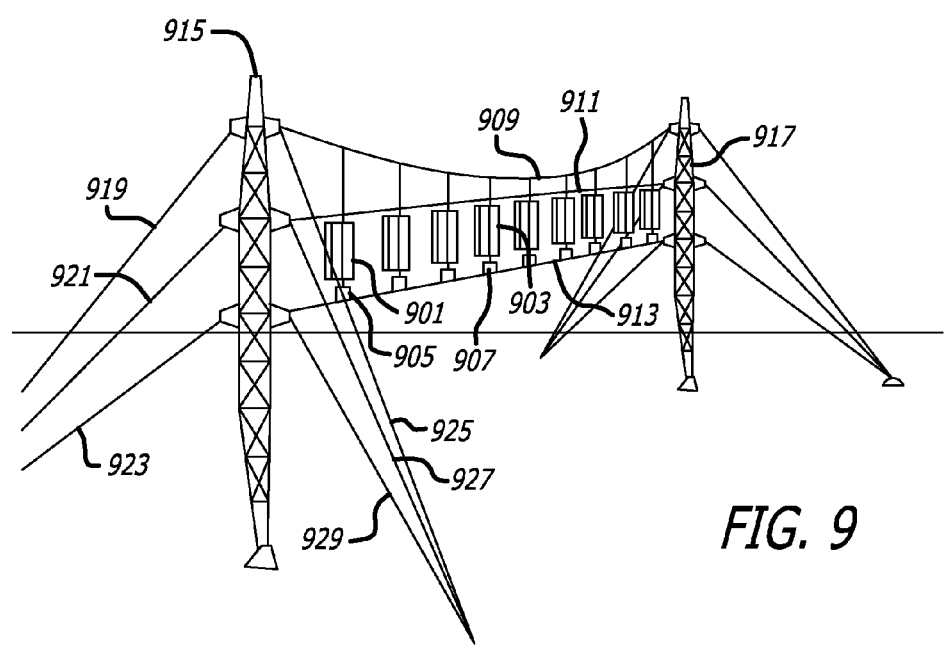
FIG. 9 illustrates a plurality of windmills and associated electric generators which are supported by two substantially parallel cables connected at each end to a tower.

FIG. 9 illustrates a plurality of windmills and associated electric generators which are supported by two substantially parallel cables connected at each end to a tower. As illustrated in FIG. 9, a plurality of windmills, such as windmills 901 and 903 and their associated electric generators, such as electric generators 905 and 907, may be arranged in a row, spaced-apart from one another, and supported by one or more cables, such as cables 909, 911, and 913. The end of each cable may be supported by a tower, such as towers 915 and 917. Guide wires may be used to help support each tower, such as guide wires 919, 921, 923, 925, 927, and 929.

As illustrated in FIG. 9, each windmill may be configured to rotate about a vertical axis.

Figure 10:
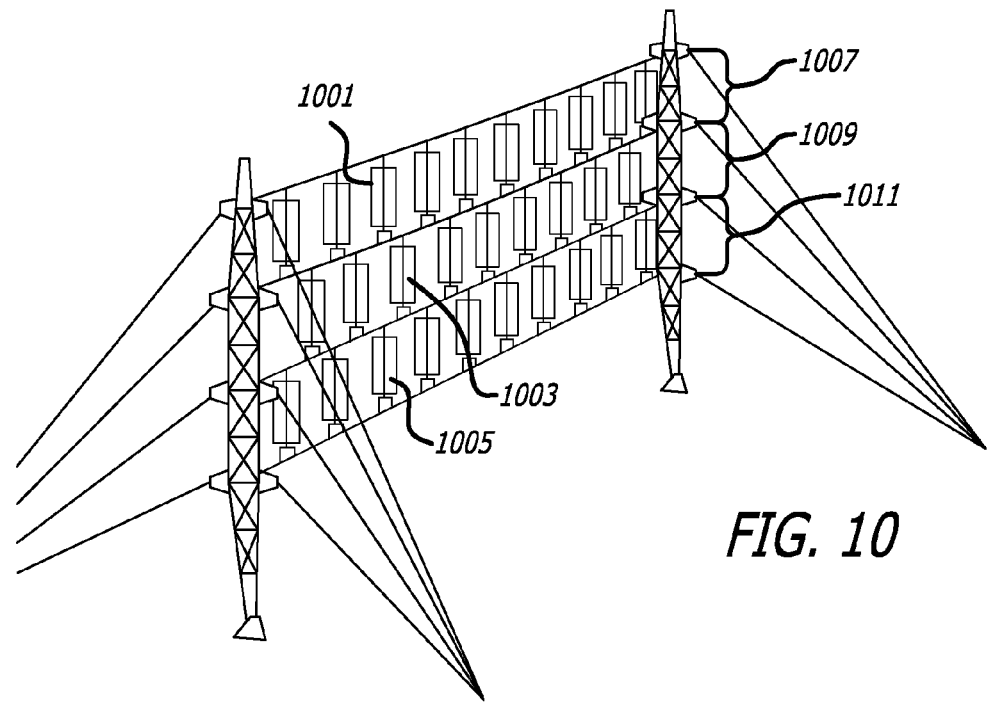
FIG. 10 illustrates a plurality of windmills and associated electric generators in stacked rows, each row being supported by two substantially parallel cables connected at each end to a tower.

FIG. 10 illustrates a plurality of windmills and associated electric generators in stacked rows, each row being supported by two substantially parallel cables connected at each end to a tower. As illustrated in FIG. 10, the windmills, such as windmills 1001, 1003, and 1005 may be placed in different rows, one stacked upon the other, such as rows 1007, 1009, and 1011.

Figure 11:
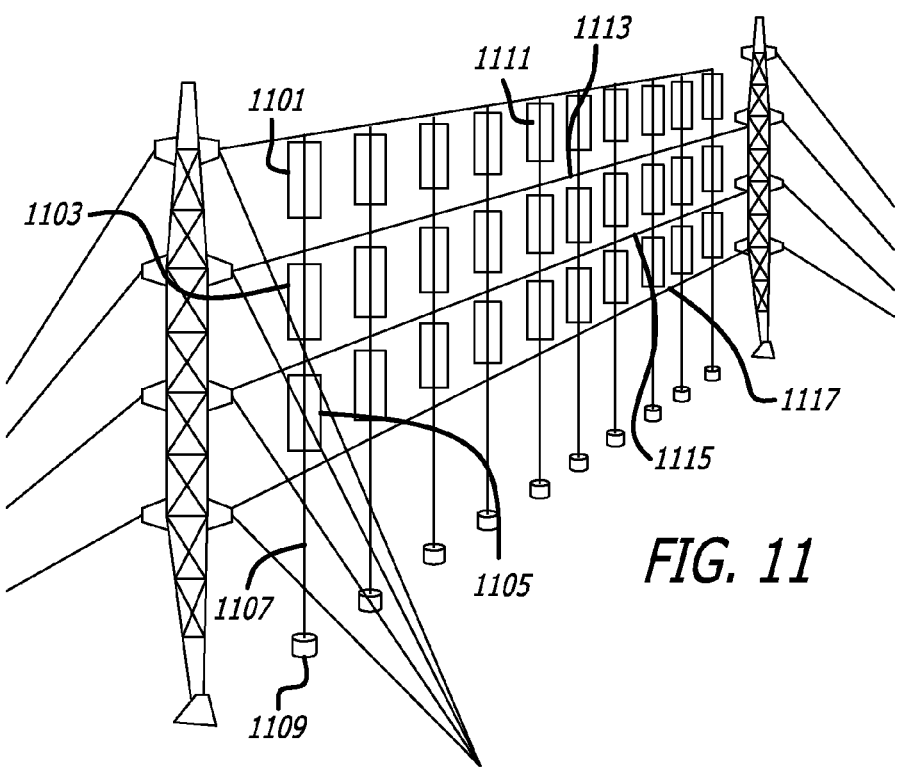
FIG. 11 illustrates a plurality of windmills in stacked rows, each row being supported by two substantially parallel cables connected at each end to a tower, each vertical column of windmills driving a common vertical shaft coupled at the ground to a common electric generator.

FIG. 11 illustrates a plurality of windmills in stacked rows, each row being supported by two substantially parallel cables connected at each end to a tower, each vertical column of windmills driving a common vertical shaft coupled at the ground to a common electric generator. As illustrated in FIG. 11, several windmills, such as windmills 1101, 1103, and 1105, may be configured to drive a common shaft, such as a common shaft 1107, which may be coupled to a common electric generator, such as a common electric generator 1109. Each of the windmills may be supported by cables, such as cables 1111, 1113, 1115, and 1117. As illustrated in FIG. 11, the electric generator 1109 may be supported by the ground, thus eliminating the need for its weight to be supported by any of the supporting cables.

Each of the windmills may be coupled to a common shaft through a coupling system which allows each of the windmills which are connected to the same shaft to rotate at different speeds during operation of the electric energy generation system. Any means may be used to facilitate this functionality. For example, one or more ratchet gears, such as are used in bicycles to permit the tire to rotate while the peddles remain stationary, may be used to couple each windmill to a common shaft, thereby allowing the common shaft to rotate at a rate which is faster than the rotational rate of some of the windmills. Each windmill may in addition or instead be coupled to its common shaft with an automatic transmission. The automatic transmission may be configured to provide a substantially constant output speed, notwithstanding changes in input speed. This may enable rotational energy which is generated by windmills that are rotating more slowly than other windmills to still be transferred to the electric generator.

To reduce stresses which may be placed on the common shafts by changes in the sagging of the supporting cables, the common shafts may each include one or more telescoping couplings which permit the length of the common shaft to extend or contract, while still ensuring that rotation torque is fully transferred from one end of the common shaft to the other end. These coupling may be placed between each set of windmills and/or between the lowest windmill and its associated electric generator.

Figure 12:
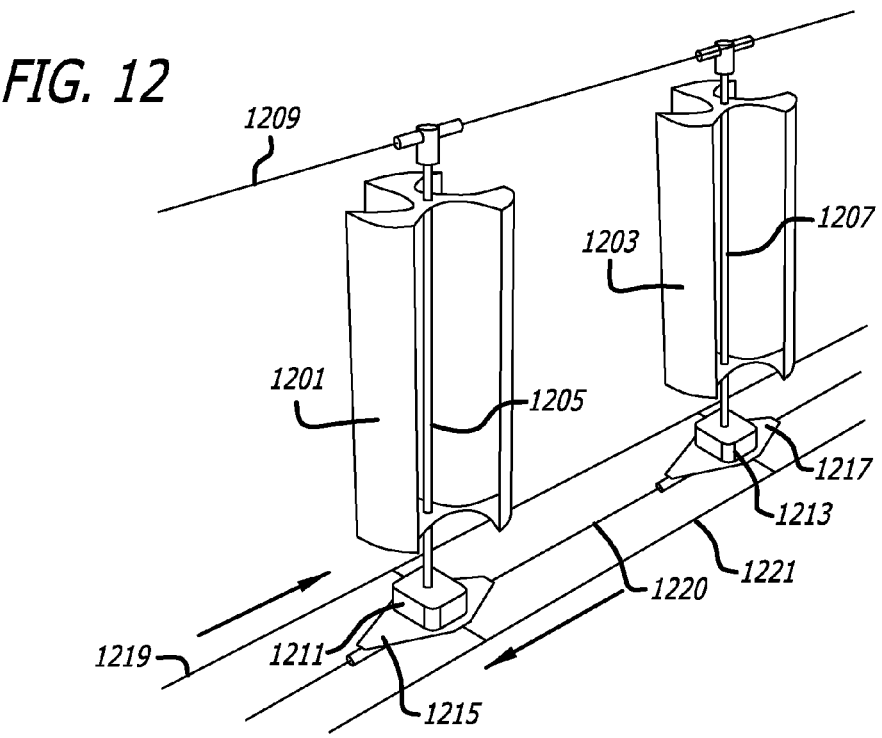
FIG. 12 illustrates a plurality of windmills and associated hydraulic pumps which are both supported by two substantially parallel cables.

FIG. 12 illustrates a plurality of windmills and associated hydraulic pumps which are both supported by two substantially parallel cables. As illustrated in FIG. 12, the windmills, such as windmills 1201 and 1203, may be configured to rotate about a vertical axis to drive, respectively, shafts, such as 1205 and 1207. The upper end of each shaft may be coupled through a bushing to an upper cable 1209. The lower end of each shaft may be coupled to a hydraulic pump, such as hydraulic pumps 1211 and 1213. Each hydraulic pump may rest on a platform, such as a platform 1215 and 1217, which, in turn, may be supported by a lower cable 1220. The pumps 1211 and 1213 may be configured to pump fluid flowing into the pumps from a fluid input line 1219 to a fluid output line 1221. Each fluid pump may be configured to provide a substantially constant output pressure, notwithstanding changes in the rotational speed of the windmill to which the hydraulic pump is coupled. A variable piston displacement mechanism which is used in some hydraulic pumps may be used here for this purpose. A check valve may be inserted in the line between the fluid input line 1219 and/or the fluid output line 1221 and each pump so as to prevent fluid from flowing backwards.

As suggested by FIG. 12, there may be several additional windmills and associated fluid pumps that receive fluid from the fluid input line 1219 and that deliver fluid to the fluid output line 1221. Although not illustrated in FIG. 12, the source end of the fluid input line 1219 and the fluid output of the fluid output line 1221 may be coupled to an electric generator which may be configured to transform the fluid flow into electric energy.

Figure 13:
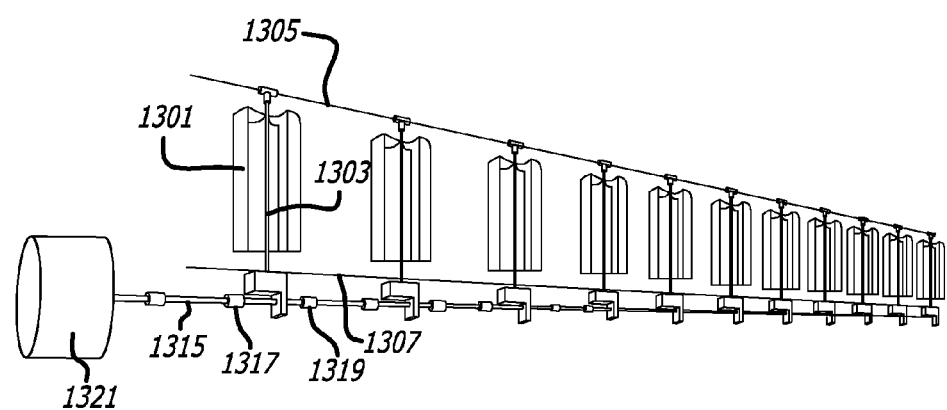
FIG. 13 illustrates a plurality of windmills supported by two substantially parallel cables, each windmill having a set of meshing beveled gears configured to drive a common shaft coupled to a common electric generator.

FIG. 13 illustrates a plurality of windmills supported by two substantially parallel cables, each windmill having a set of meshing beveled gears configured to drive a common shaft coupled to a common electric generator. FIG. 14 illustrate an enlarged view of the lower section of one of these windmills and its associated meshing beveled gears. As illustrated in FIGS. 13 and 14, a plurality of spaced-apart windmills, such as a windmill 1301, may be configured to rotate about a vertical axis to drive a shaft, such as a shaft 1303. The upper part of the shaft 1303 may be coupled through a bushing to an upper cable 1305. The lower portion of the shaft 1303 may be coupled through a bushing to a lower cable 1307 and into an automated transmission, such as an automatic transmission 1401. The automatic transmission 1401 may be configured to provide a substantially constant output speed, not withstanding changes in the input speed. The output of the automatic transmission 1401 may be coupled to a beveled gear, such as a beveled gear 1403 which may be configured to drive a corresponding beveled gear 1405 around a rotational axis which is substantially perpendicular to the rotational axis of the beveled gear 1403. In turn, the beveled gear 1405 may be configured to drive a common shaft 1315.

The common shaft 1315 may include a flexible or telescoping coupling or a universal joint between each windmill, such as flexible or telescoping couplings 1317 and 1319. Each flexible or telescoping coupling may enable the common shaft 1315 to flex about its longitudinal axis, while still fully transferring torque applied at one end of the common shaft 1315 to the other end. An end of the common shaft 1315 may be coupled to an electric generator 1321.

FIG. 15 illustrates a plurality of windmills which drive a common horizontal shaft coupled to a common electric generator. As illustrated in FIG. 15, a plurality of windmills, such as windmills 1501 and 1503, may be coupled to a common horizontal shaft 1505, which may be anchored at an end 1507 through a bushing to a support structure 1509 and coupled at the other end to an electric generator 1511 which, in turn, may be supported by a support structure 1513. Again, various means may be employed to allow each windmill to rotate at a speed different from the speed of the other windmills, such as a ratchet-gear and/or automatic transmission, as discussed above.

Figure 16:
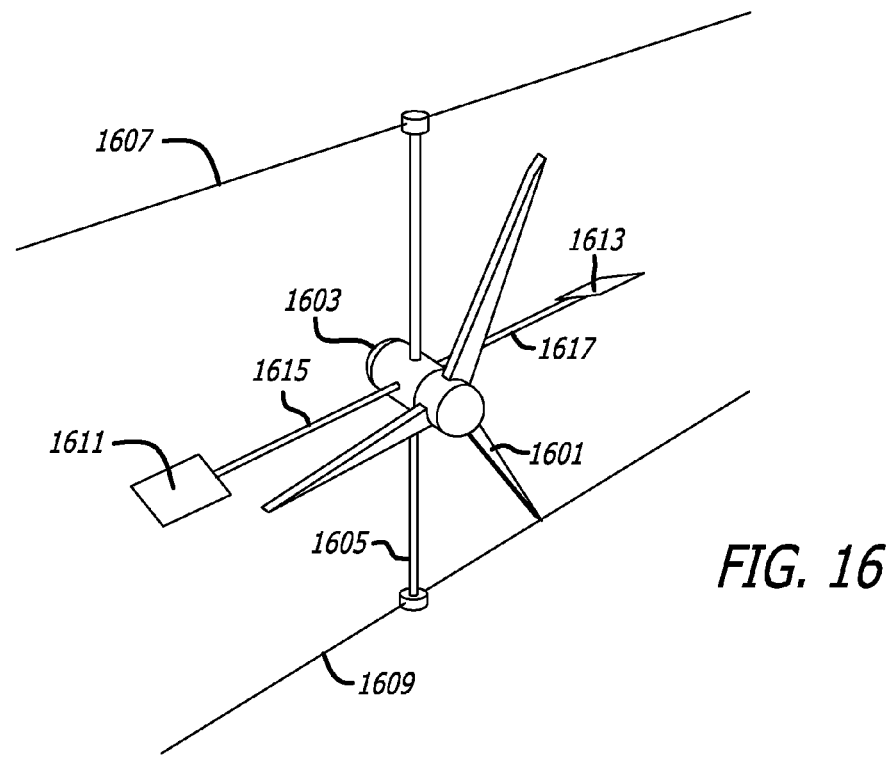
FIG. 16 illustrates a windmill and associated electric generator which are supported by two substantially parallel cables and an opposing set of torque-counterbalancing flaps.

FIG. 16 illustrates a windmill and associated electric generator which are supported by two substantially parallel cables and an opposing set of torque-counterbalancing flaps. As illustrated in FIG. 16, a windmill 1601 may be coupled to an electric generator 1603 which may be supported by a vertical support 1605 coupled at an upper end through a bushing to an upper cable 1607 and at a lower end through a bushing to a lower cable 1609. Rotational torque may be applied during operation of the electrical energy generation system to the vertical support 1605 by the electric generator 1603. This may occur in response to rotation of the windmill 1601 and in response to a load on the voltage which is generated by the electric generator 1603. One or more flaps, such as opposing flaps 1611 and 1613 in conjunction with opposing horizontal arms 1615 and 1617, may be configured to convert wind energy into a counterbalancing torque to counterbalance the torque which is applied by the electric generator 1603.

Figure 17:
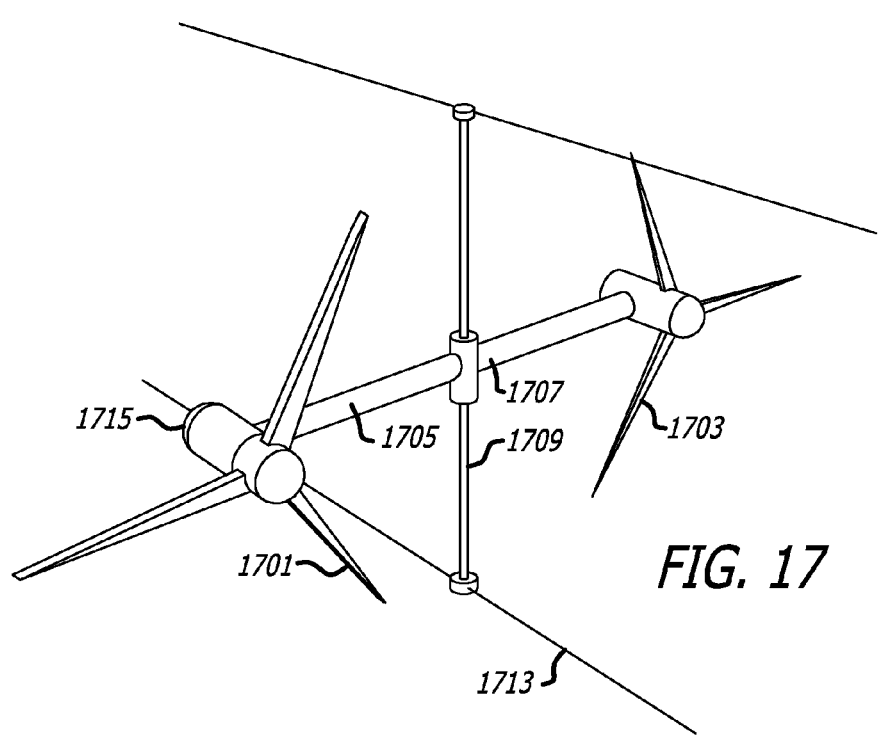
FIG. 17 illustrates two windmills which rotate in opposite directions and associated electric generators which are supported by two substantially parallel cables.

FIG. 17 illustrates two windmills which rotate in opposite directions and associated electric generators which are supported by two substantially parallel cables. As illustrated in FIG. 17, windmills 1701 and 1703 may be configured to face in the same direction, but to rotate in opposite directions. The two windmills may be connected by arms 1705 and 1707, respectively, to support 1709 which may be coupled at an upper end through a bushing to an upper cable 1711 and at a lower end through a bushing to a lower cable 1713. The windmills 1701 and 1703 may be configured and mounted so that their opposing rotational directions substantially cancel the rotational torque which their respective electric generators 1715 and 1719 may generate.

Figure 18:
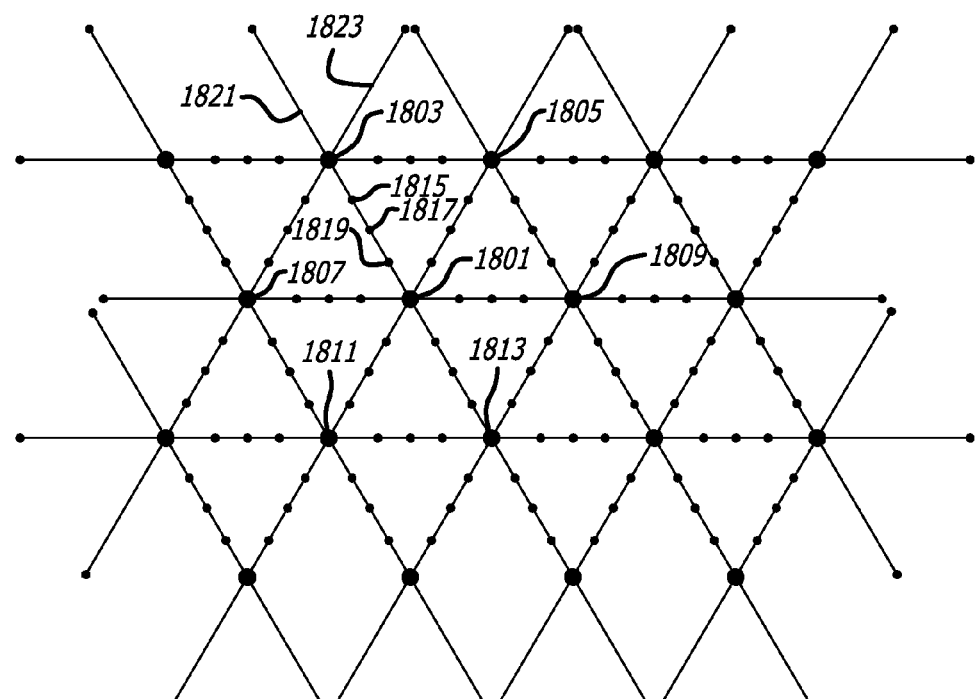
FIG. 18 illustrates a plurality of windmills supported by a rhombic lattice of substantially vertical supports, each of which is connected to each of its immediate neighbors by at least one substantially horizontal cable.

FIG. 18 illustrates a plurality of windmills supported by a rhombic lattice of substantially vertical supports, each of which is connected to each of its immediate neighbors by at least one substantially horizontal cable. As illustrated in FIG. 18, a lattice of substantially vertical supports, such as substantially vertical supports 1801, 1803, 1805, 1807, 1809, 1811, and 1813, may be configured in a lattice, such as in a rhombic lattice. Each vertical support may be connected to each of its immediate neighbors by at least one substantially horizontal cable. For example, vertical support 1801 may be connected to each of its immediate neighbors, that is, vertical supports 1803, 1805, 1807, 1809, 1811, and 1813. One or more windmills may be supported by each connecting cable or cables, such as windmills 1815, 1817, and 1819. Only the vertical supports on the perimeter of the lattice may be anchored by angled guide wires, such as by angled guide wires 1821 and 1823 in connection with vertical support 1803. The interior vertical supports, such as the vertical support 1801, may not be supported by any angled guide wire.

Figure 19:
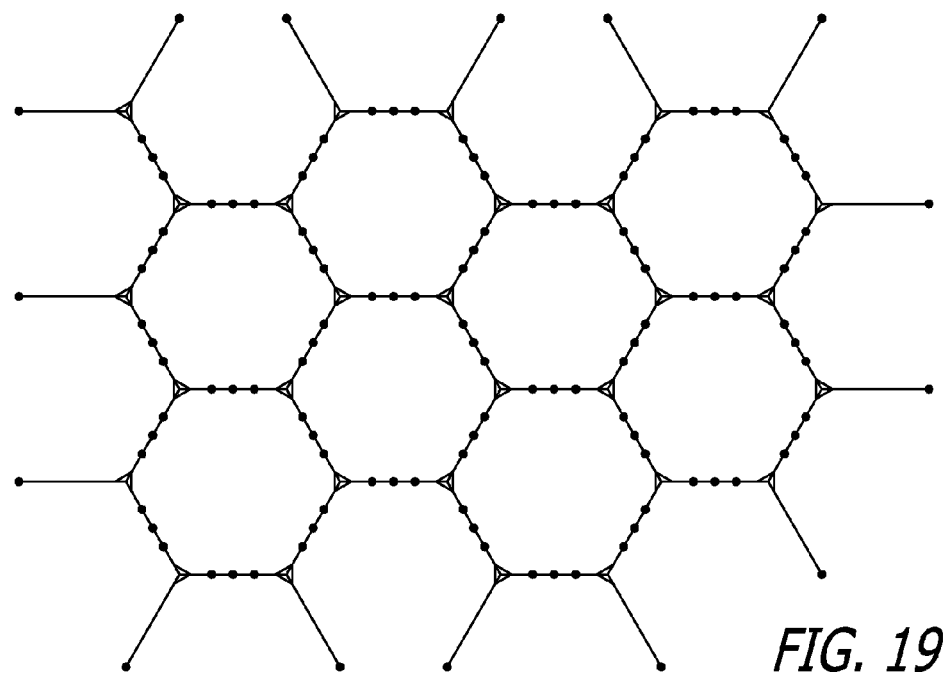
FIG. 19 illustrates a plurality of windmills supported by a hexagonal lattice of substantially vertical supports, each of which is connected to each of its immediate neighbors by a substantially horizontal cable.

FIG. 19 illustrates a plurality of windmills supported by a hexagonal lattice of substantially vertical supports, each of which is connected to each of its immediate neighbors by a substantially horizontal cable. FIG. 19 is comparable to FIG. 18, except that the lattice is illustrated as being hexagonal, rather than rhombic. Any other type of lattice configuration may be used in addition or instead.

Figure 20:
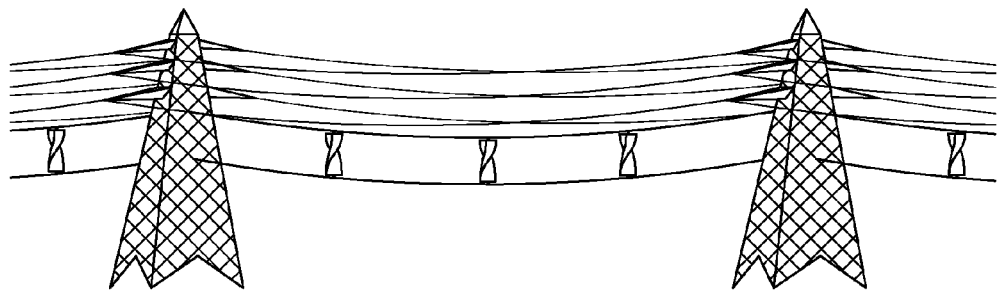
FIG. 20 illustrates a plurality of windmills and associated electric generators which are supported by two substantially parallel cables connected at each end to electric transmission towers.

FIG. 20 illustrates a plurality of windmills and associated electric generators which are supported by two substantially parallel cables connected at each end to electric transmission towers. FIG. 20 illustrates how existing electric transmission towers may be adapted to additionally support a plurality of windmills and their associated electric generators.

Figure 21:
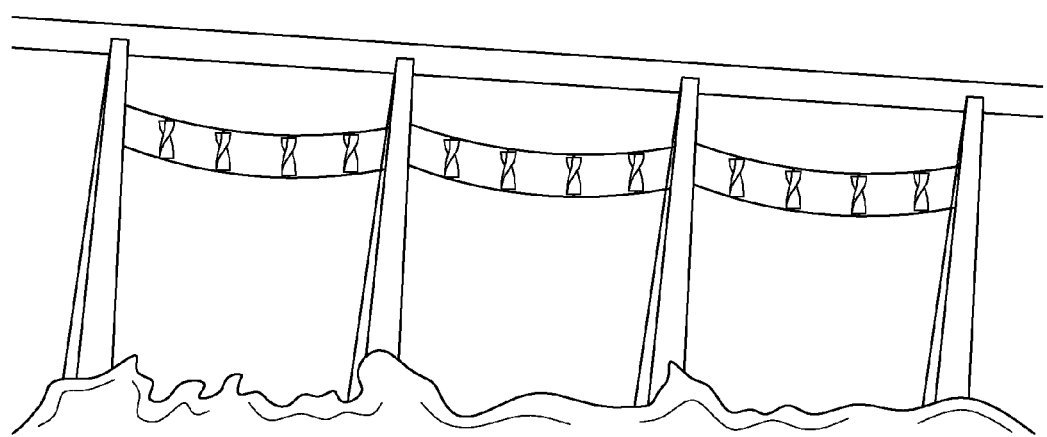
FIG. 21 illustrates a plurality of windmills and associated electric generators which are supported by two substantially parallel cables connected at each end to bridge columns.

FIG. 21 illustrates a plurality of windmills and associated electric generators which are supported by two substantially parallel cables connected at each end to bridge columns. FIG. 21 illustrates how existing bridge columns may be adapted to support a plurality of windmills and their associated electric generators.

The components, steps, features, objects, benefits and advantages which have been discussed are merely illustrative. None of them, nor the discussions relating to them, are intended to limit the scope of protection in any way. Numerous other embodiments are also contemplated. These include embodiments which have fewer, additional, and/or different components, steps, features, objects, benefits and advantages. These also include embodiments in which the components and/or steps are arranged and/or ordered differently.

For example, wind turbines different from what have been described may be used in the configurations which have been disclosed. Similarly, different types of mechanical power transmission methods may be used to connect the output of individual turbines to a common drive shaft. The various arrangements which have been described may be used in offshore applications and/or for pumping water rather than producing electricity.

Unless otherwise stated, all measurements, values, ratings, positions, magnitudes, sizes, and other specifications which are set forth in this specification, including in the claims which follow, are approximate, not exact. They are intended to have a reasonable range which is consistent with the functions to which they relate and with what is customary in the art to which they pertain.

All articles, patents, patent applications, and other publications which have been cited in this disclosure are incorporated herein by reference.

The phrase "means for" when used in a claim is intended to and should be interpreted to embrace the corresponding structures and materials which have been described and their equivalents. Similarly, the phrase "step for" when used in a claim is intended to and should be interpreted to embrace the corresponding acts which have been described and their equivalents. The absence of these phrases in a claim mean that the claim is not intended to and should not be interpreted to be limited to any of the corresponding structures, materials, or acts or to their equivalents.

None of the claims are intended to embrace non-statutory subject matter, such as an abstract idea, law of nature or natural phenomena; obvious subject matter; nor subject matter lacking novelty, nor should they be interpreted in such a way. Any unintended embracement of such subject matter is hereby disclaimed.

Except as otherwise stated immediately above, nothing which has been stated or illustrated is intended or should be interpreted to cause a dedication of any component, step, feature, object, benefit, advantage, or equivalent to the public, regardless of whether it is recited in the claims.

The scope of protection is limited solely by the claims which now follow. That scope is intended and should be interpreted to be as broad as is consistent with the ordinary meaning of the language which is used in the claims when interpreted in light of this specification and the prosecution history which follows and to encompass all structural and functional equivalents.

The invention claimed is:

1. An electric energy generation system comprising:
a plurality of windmills, each configured to transform wind energy into rotational energy;
a windmill support system supporting the plurality of windmills in positions that are spaced apart from one another;
an electric generator configured to transform rotational energy into electric energy; and
a coupling system, including a common shaft configured to be driven by each of the plurality of windmills, comprising:
a flexible coupling between each neighboring set of windmills configured to permit the common shaft to bend along its shaft axis during operation of the electric energy generation system, or
a telescoping coupling between each neighboring set of windmills configured to permit the length of the common shaft between each neighboring set of windmills to change during operation of the electric energy generation system,
wherein the coupling system is configured to couple the rotational energy generated by each of the plurality of windmills to the electric generator in a manner that permits the plurality of windmills to rotate at different speeds during operation of the electric energy generation system.

2. The electric energy generation system of claim 1 wherein the coupling system includes:
a common shaft configured to be driven by each of the plurality of windmills; and
for each of the plurality of windmills, a ratchet gear coupling the windmill to the common shaft.

3. The electric energy generation system of claim 1 wherein the coupling system includes:
a common shaft coupled to each of the plurality of windmills; and
for each of the plurality of windmills, an automatic transmission connected between the windmill and the common shaft.

4. The electric energy generation system of claim 1 wherein the electric generator is on the ground.

5. The electric energy generation system of claim 1 wherein the windmill support system includes at least one cable supporting the windmills.

6. The electric energy generation system of claim 5 wherein:
the coupling system includes a common shaft coupled to each of the plurality of windmills; and
the common shaft includes a flexible coupling between each neighboring set of windmills configured to permit the common shaft to bend along its shaft axis during operation of the electric energy generation system.

7. The electric energy generation system of claim 5 wherein:
the coupling system includes a common shaft coupled to each of the plurality of windmills; and
the common shaft includes a telescoping coupling between each neighboring set of windmills configured to permit the length of the common shaft between each neighboring set of windmills to change during operation of the electric energy generation system.

8. The electric energy generation system of claim 1 wherein:
the windmill support system includes:
two cables spaced apart from one another; and
a windmill support coupled to the two cables and to the windmills;
and further comprising:
a counterbalancing system configured to substantially counterbalance rotational torque applied by the windmills to the windmill support during operation of the electric energy generation system.

9. The electric energy generation system of claim 8 wherein the counterbalancing system includes at least one flap configured to convert wind energy into counterbalancing rotational force that is applied to the windmill support during operation of the electrical energy generation system.

10. The electric energy generation system of claim 8 further comprising an arm connected between the flap and the windmill support.

11. The electric energy generation system of claim 8 wherein:
one of the windmills is a first windmill; and
the counterbalancing system includes a second of the windmills configured to rotate in a direction opposite the rotational direction of the first windmill during operation of the electric energy generating system.

12. The electric energy generation system of claim 11 wherein the counterbalancing system includes an arm coupled to the windmill support and to and between each of the windmills.

13. The electric energy generation system of claim 12 wherein the first and the second windmills both face in the same direction.

14. The electric energy generation system of claim 1 further comprising:
an energy transfer system configured to transfer the rotational energy generated by each of the plurality of windmills to the electric generator, the energy transfer system including:
for each of the windmills, a hydraulic pump coupled to the windmill and configured to transform the rotational energy of the windmill into fluidic pressure; and
a hydraulic motor coupled to the electric generator and configured to transform the fluidic pressure from the hydraulic pumps into rotational energy.

15. The electric energy generation system of claim 14 wherein the energy transfer system includes, for each of the hydraulic pumps, a check valve configured to prevent fluid from flowing through the hydraulic pump in the reverse direction.

16. The electric energy generation system of claim 14 wherein each of the hydraulic pumps are configured to provide a substantially constant output pressure, not withstanding changes in the rotational rate of the windmill to which the hydraulic pump is coupled.

17. An electric energy generation system comprising:
a windmill support system which includes a lattice of substantially vertical supports that lie in substantially different planes and at least one substantially horizontal cable connecting each vertical support to each of its immediately neighboring vertical supports;
at least one windmill suspended from each of the substantially horizontal cables; and
one or more electric generators configured to transform the rotational energy from the plurality of windmills into electric energy.

* * * * *